June 16, 1942.  L. N. JONES  2,286,998
PROCESS FOR TREATING PINEAPPLE
Filed March 12, 1940
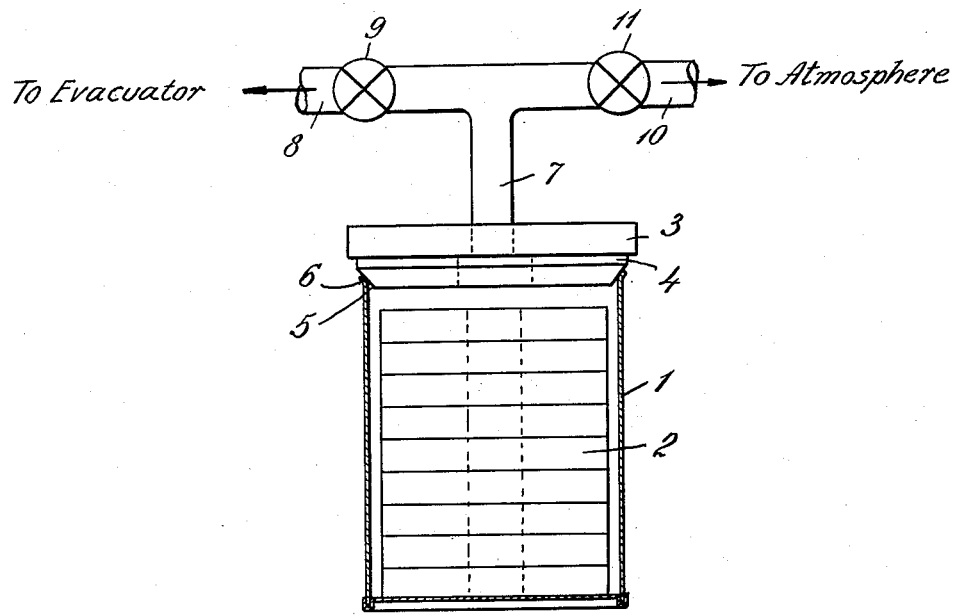
INVENTOR
Lucian N. Jones
BY
Pennie, Davis, Marvin & Edmonds
HIS ATTORNEYS Patented June 16, 1942

2,286,998

UNITED STATES PATENT OFFICE 2,286,998

PROCESS FOR TREATING PINEAPPLE

Lucian Norwood Jones, Richmond, Va., assignor, by mesne assignments, to The Girdler Corporation, Louisville, Ky., a corporation of Delaware Application March 12, 1940, Serial No. 323,503

5 Claims. (Cl. 99—100)

This invention relates to the canning of pineapple and more particularly concerns a novel process for improving the quality and appearance of fresh pineapple meat as a preliminary to canning.

Fresh pineapples, when peeled and sliced or otherwise sub-divided, vary considerably in texture and color. Thus the select or first quality fruit has a substantially uniform amber color and a uniform translucent appearance. A second grade of fruit is available which has all of the desirable qualities of the first grade except appearance. This second grade pineapple is more opaque than the first grade and is characterized by the presence of white or opaque streaks or sections which give the appearance of non-uniformity of structure and texture. This second grade of pineapple, although possessing all of the nutritive value and pleasing flavor of the first quality fruit, brings a considerably lower price than the first grade solely because of its non-uniform or streaked appearance and light or whitish color.

It has been proposed to improve the appearance of the above described second grade pineapple by the use of steam or by subjecting the fruit to a low degree of vacuum. This procedure has not been wholly successful in that the steam treatment removes all of the natural pattern of the fruit and injures some of its physical properties such as taste and general appearance, while the low vacuum treatment does not remove the undesirable opacity.

With the above and other considerations in mind, it is proposed in accordance with the present invention to provide a process for improving the appearance of solid pineapple meat by the aid of high vacuum, the process being effective to eliminate white streaks or sections whereby a uniform translucent appearance and golden or amber color are produced without eliminating the natural pattern and texture of the fruit or injuring the flavor thereof.

In general, the process comprises subjecting the peeled and sliced or otherwise sub-divided pineapple meat to a high vacuum sufficient to cause flashing or boiling of some of the liquid naturally contained within the fruit structure into vapor whereby intercellular air is washed out of the structure, and then breaking the vacuum whereby the appearance of the fruit is improved, apparently either by the collapse of the fruit cells or intercellular spaces due to the increase in absolute pressure or by the penetration of natural fruit juice or syrup or a mixture thereof, into the cellular structure under such increased pressure.

The process of the invention may be carried out with various forms of apparatus and is not limited to treatment in any particular type of container. In many cases, it is desirable to perform my improved process after the pineapple has been packed in a can or other container. I have accordingly diagrammatically illustrated in the single figure of the accompanying drawing certain apparatus for carrying out the process with the fruit in a can or like container. The single figure of the drawing is a view, partly in section, of a can with an evacuating head connected thereto.

As shown in the drawing, a can 1 is filled with cored slices of peeled pineapple 2 and a movable head 3 is provided for engagement with the open can top. The head 3 preferably carries a soft rubber sealing ring or gasket 4 on its undersurface and the edges of this ring may be tapered as shown at 5 to provide an air-tight fit within the rim 6 of the can 1 when the head 3 is pressed downwardly on the can as shown. A duct 7 is suitably connected to an opening through the head 3 and the sealing ring 4, and this duct is selectively connectible to an evacuating mechanism and to the atmosphere. As shown, a vacuum pipe 8 provided with a valve 9 is connected from the duct 7 to suitable evacuating mechanism such as a pump or steam jet evacuator (not shown) and a vent pipe 10 provided with a valve 11 is also connected to the duct 7.

In performing my process, the peeled fresh pineapple of the grade requiring improvement as to appearance and in the form of slices, chunks, spheres or solid pieces of other form, is placed in a container such as the can 1. The pineapple meat in the can may be covered with the natural pineapple juice, a suitable syrup or a mixture of juice and syrup, although the introduction of such liquid is not in all cases essential. The can 1 is then connected to the evacuating mechanism by lowering the head 3, pressing the sealing ring 4 against the can rim 6, closing the valve 11 and opening the valve 9. The can contents is then subjected to a vacuum of sufficient magnitude to cause flashing or boiling of the liquid in the pineapple structure.

The vacuum empoyed should be such as to produce an absolute pressure appreciably lower than the vapor pressure of the liquid contained in the fruit structure at its initial temperature, so that immediate flashing or boiling of the fruit liquid takes place and continues for an interval. The value of the vacuum thus employed depends upon the temperature of the fruit under treatment. The liquid present in the cellular structure of the pineapple is primarily a water solution or suspension of various sugars and other substances, and its boiling point or vapor pressure curve approximates that of water. Thus if the fruit is cold, that is, at a temperature of about 70 to 85° F., a vacuum of 29.4 inches of mercury (that is, an absolute pressure of .6 inches of mercury) is sufficient to cause effective flashing, since this corresponds to a water vapor pressure temperature of about 63.9° F. If the fruit is hot, say at about 125° F., a vacuum of 26.5 inches of mercury (that is, an absolute pressure of about 3.5 inches of mercury) is sufficient and corresponds to a water vapor pressure temperature of about 120.47° F.

The maximum period for which the vacuum is maintained is not critical, but in general, I prefer to discontinue evacuation substantially at the end of the minimum period necessary to produce the desired improvement in appearance, so that needless dehydration of the product may be avoided. I have found that satisfactory results are obtained by continuing the vacuum boiling of liquid for at least about 5 to 6 seconds, although the vacuum boiling may be continued for longer periods, in some cases with slightly improved results.

At the end of the vacuum treatment, the evacuating mechanism is cut off by closing the valve 9. The vacuum in the can 1 is then broken by opening the valve 11, and the increase in absolute pressure either forces fruit juices or syrup into the cells or intercellular spaces of the pineapple structure or collapses the cells or spaces from which the air has previously been removed by the vacuum step. As pointed out above, it is not essential that the fruit be covered with juice or syrup at the beginning of the process or when the vacuum is broken. If juice or syrup is present during evacuation, some of this liquid may be lost by entrainment in the vapor evolved and withdrawn. The juice or syrup may be introduced at the conclusion of the evacuating step just before the vacuum is broken, but excellent results are also obtained if no juice or syrup is introduced and the vacuum is broken merely by the introduction of air.

As a result of my process, the natural texture of the pineapple is made uniformly translucent by the elimination of white or opaque streaks or patches, and both the color and the flavor are improved. Although the pattern of the fruit texture is reduced by the elimination of the white streaks and opaque portions, the natural pattern of the cellular structure is not destroyed, and the treated fruit has all of the visual characteristics of the first or highest quality fruit.

It is my belief that my improved process results in a washing out of entrapped air or other non-condensible gases from the cellular structure of the pineapple meat by means of the vapor generated in this structure during the flashing or boiling of the liquid naturally contained therein under the high vacuum. Upon the release of the vacuum, the natural fruit juice or a syrup, if present, may be forced back into the cellular structure to replace the air or gas thus removed, or the cellular structure may be collapsed by the increase in absolute pressure, and undesirable opacity is eliminated. Although the foregoing explanation is based on my observation of the process and the results obtained thereby, it should be understood that the invention is not in any way dependent upon or limited by the correctness of the explanation given.

I claim:

1. A process for improving the appearance of pineapple which comprises flashing into vapor a portion of the natural liquid of peeled pineapple meat by subjecting the latter to a vacuum sufficient to produce a pressure appreciably below the vapor pressure of said liquid in the pineapple at the temperature thereof, and then breaking the vacuum.

2. A process for improving the appearance of pineapple which comprises flashing into vapor a portion of the natural liquid of peeled pineapple meat by subjecting the latter to a vacuum sufficient to produce a pressure appreciably below the vapor pressure of said liquid in the pineapple at the temperature thereof, maintaining such vacuum for an interval of at least five seconds, and then breaking the vacuum.

3. A process for improving the appearance of pineapple which comprises flashing into vapor a portion of the natural liquid of peeled solid pineapple meat, and removing said vapors from the pineapple by subjecting the latter to a sub-atmospheric pressure appreciably below the vapor pressure of water at the temperature of the pineapple, covering the pineapple with liquid and increasing the absolute pressure on the pineapple to a value above the vapor pressure of water.

4. A process for improving the appearance of pineapple which comprises flashing into vapor a portion of the natural liquid of peeled solid pineapple meat, and removing said vapors from the pineapple by subjecting the latter to a sub-atmospheric pressure appreciably below the vapor pressure of water at the temperature of the pineapple, continuing the boiling at reduced pressure for an interval of at least five seconds and increasing the absolute pressure on the pineapple to substantially atmospheric pressure.

5. In a process for improving the appearance of pineapple, the step which comprises sweeping out the air from peeled solid parts of pineapple by the action of vapor generated in said parts under a sub-atmospheric pressure below the vapor pressure of the liquid naturally contained in the pineapple at the temperature of the pineapple, and continuing the application of such sub-atmospheric pressure for at least five seconds.

LUCIAN NORWOOD JONES.